(12) United States Patent
Rangan et al.

(10) Patent No.: US 8,520,723 B2
(45) Date of Patent: Aug. 27, 2013

(54) UNIVERSAL REAL-TIME INTERFACE FOR WIRELESS MODEMS

(75) Inventors: Sundeep Rangan, Jersey City, NJ (US); Prashanth Hande, Somerset, NJ (US); Niranjan N. Ratnakar, Bridgewater, NJ (US); Ozge Koymen, Jersey City, NJ (US); Ritesh K. Madan, Jersey City, NJ (US); Atul Maharshi, South Orange, NJ (US); Subhadeep P. Roy, Piscataway, NJ (US); Siddharth Ray, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 12/963,910

(22) Filed: Dec. 9, 2010

(65) Prior Publication Data

US 2012/0147936 A1  Jun. 14, 2012

(51) Int. Cl.
*H04B 1/38* (2006.01)
(52) U.S. Cl.
USPC .......................................... 375/222; 375/295
(58) Field of Classification Search
USPC ......................................... 375/219, 222, 295
See application file for complete search history.

(56) References Cited

U.S. PATENT DOCUMENTS

| 7,583,620 | B2 | 9/2009 | Jeon et al. |
| 2005/0002363 | A1* | 1/2005 | Cheng et al. .................. 370/338 |
| 2007/0136311 | A1* | 6/2007 | Kasten et al. .................. 707/10 |
| 2007/0213038 | A1 | 9/2007 | Masseroni et al. |
| 2008/0192711 | A1 | 8/2008 | Balachandran et al. |
| 2009/0021572 | A1 | 1/2009 | Garudadri et al. |
| 2009/0083431 | A1 | 3/2009 | Balachandran et al. |

FOREIGN PATENT DOCUMENTS

| EP | 1462941 A2 | 9/2004 |
| EP | 1638291 A2 | 3/2006 |
| WO | WO0230033 A2 | 4/2002 |

OTHER PUBLICATIONS

International Search Report and Written Opinion—PCT/US2011/063593—ISA/EPO—Mar. 5, 2012.

\* cited by examiner

*Primary Examiner* — David B Lugo
(74) *Attorney, Agent, or Firm* — James K. O'Hare

(57) ABSTRACT

The apparatus and methods described herein are used to provide data between an application and a modem. One method includes providing data in application data units from the application to the modem, transmitting the data from the modem to a receiver, and reporting by the modem to the application, whether each application data unit has been successfully transmitted from the modem to the receiver.

20 Claims, 8 Drawing Sheets

UNIVERSAL REAL-TIME INTERFACE FOR WIRELESS MODEMS

BACKGROUND

1. Field

The invention relates to applications for wireless communications. More particularly, the invention relates to a universal real-time interface for wireless modems.

2. Background

FIG. 1 is a simplified prior art system 100 showing protocol stacks for a transmitter 101 and a receiver 106. The two protocol stacks are based on the Open System Interconnection (OSI) Reference Model. The two protocol stacks are simplified examples for the transmitter 101 and the receiver 106. The simplified protocol stack for the transmitter 101 (listed top-down) includes an application layer 102, a transport layer 103, a data link layer 104, and a physical layer 105. The simplified protocol stack for the receiver 106 (listed top-down) includes an application layer 107, a transport layer 108, a data link layer 109, and a physical layer 110. The two physical layers 105 and 110 are connected to a wired-wireless network 113 and are configured to deliver (both in single-cast and multi-cast) streaming and real-time multimedia data.

The physical layers 105 and 110 include a set of rules that specifies the electrical and physical connection between the transmitter 101 and the receiver 106. At the device interfaces, the physical layers 105 and 110 specify the procedure for a correct transfer of data on slots, for example, TDMA/FDMA, encryption, interleaving, channel coding, FEC, and the reverse functions.

The data link layers 104 and 109 indicate how the transmitter 101 and the receiver 106 gains access to the medium specified in the physical layers 105 and 110. The data link layers 104 and 109 also define data formats, to include the framing of data within transmitted messages, error control procedures and other link control activities. From defining data formats to including procedures to correct transmission errors, the data link layers 104 and 109 are responsible for the reliable delivery of information. The data link layers 104 and 109 may be divided into two sublayers: a Logical Link Control (LLC) and a Media Access Control (MAC).

The transport layers 103 and 108 include an end-to-end real-time transport protocol (RTP)/real-time control protocol (RTCP) for providing standardized real-time feedback from the receiver 106 to the transmitter 101. One or more channels 111 and 112 may be used to transmit the control information. Both the RTP and the RTCP convey media data flows over a transmission control protocol (TCP) or a user datagram protocol (UDP). The RTP carries data with real-time requirements while the RTCP conveys information of the participants and monitors the quality of the RTP session. The transport layers 103 and 108 are responsible for guaranteeing that the transfer of information occurs correctly after a route has been established through the network 113. The transport layers 103 and 108 are used for error control, sequence checking, and other end-to-end data reliability factors.

The application layers 102 and 107 act as a window through which the applications gain access to all of the services provided by the underling protocols.

Data links in wireless networks by nature experience large variations in short term data rates due to changing channel and interference conditions. In packet networks supporting bursty data, network loading can also change rapidly. For many applications, buffering can be used to average out these variations. Slower rate adaptation can then be used, in conjunction with the buffering, to track out longer term changes in the channel rate.

However, buffering leads to delays which may not be permissible in certain interactive applications. That is, with tight delay constraints, short term drops in data rates results in dropped packets. In these cases, it is useful for the application to have fast feedback of the data communication losses so that the application can rapidly adjust to the lower rate and compensate for losses appropriately.

Two examples where such fast feedback is useful is (1) interactive or delay-sensitive video and (2) multi-player gaming video. Video can often be transmitted with a large range in quality by changing the spatial, temporal or pixel resolution. Feedback on the instantaneously channel rate can be used to adapt the video quality appropriately. Also, highly compressed video is typically transmitted with predictive coding to exploit temporal correlations. In predictive coding, frames at any one time instant are referenced against previous video frames. As a result, losses of video frames can propagate to several future frames until the next synchronization or intra-frame. Hence, fast feedback is useful to detect these losses quickly to reduce the error propagation.

In multi-player gaming video, communication losses result in state disconnect between different players. For example, the first player can think he has fired while the second player does not know he has been shot. In this example, fast detection of losses is needed to minimize the time delay in the discrepancies between the different player states.

As illustrated in the above examples, wireless channels can be unreliable and prone to errors and the end-to-end feedback from the wireless channel losses can be used at the application layers 102 and 107. Two existing mechanisms that can be used to provide feedback of the channel losses are (1) end-to-end feedback and (2) radio access technology feedback. First, communication protocols (such as RTP and RTCP) of the transport layers 103 and 108 provide the end-to-end feedback from the receiver 106 to the transmitter 101 and vice versa. RTCP packets contain direct information for quality of service (QoS) monitoring and congestion control of wireless channels. For example, sender reports (SR) and receiver reports (RR) exchange information on packet loss, jitter, and round-trip delay statistics of wireless channels. The transmitting end applications deliver SR to the receiving end applications and the receiving end applications deliver RR to the transmitting end applications.

The end-to-end feedback can be used by the transmitter 101 to adapt its channel rate to adjust to the channel errors. Also, the end-to-end feedback can be conducted completely at the transport layers 103 and 108 so the physical layers 105 and 110 are transparent to the applications. However, the end-to-end feedback has several drawbacks. For example, the end-to-end feedback has the cost of the round-trip end-to-end delay. Also, in wireless links, the end-to-end feedback consumes air-link resources, and generally only provides aggregate statistical information.

Second, some applications, for example cellular voice applications, are designed together with the radio access technology. This permits several cross-layer optimizations such as frame sizes that match the application, dedicated channels with appropriate rate adaptation, and physical layer specific feedback. More generally, given any radio access technology, one can develop a custom interface between a modem and a specific application. In this approach, however, the application interface has to be redesigned for each wireless technology. This eliminates the modularity between layers.

Therefore, it has been recognized by those skilled in the art that a need exists for feedback of channel losses that provides less delay and greater detail than the end-to-end feedback and can also be applied to a range of radio access technologies.

SUMMARY

The apparatus and methods described herein are used to provide data between an application and a modem. One method includes providing data in application data units from the application to the modem, transmitting the data from the modem to a receiver, and reporting by the modem to the application, whether each application data unit has been successfully transmitted from the modem to the receiver.

An apparatus for providing data, the apparatus including an application for providing data in application data units, and a modem for receiving the data and transmitting the data to a receiver, the modem configured to report to the application, whether each application data unit has been successfully transmitted from the modem to the receiver.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods, apparatus, and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements.

Figure 1:
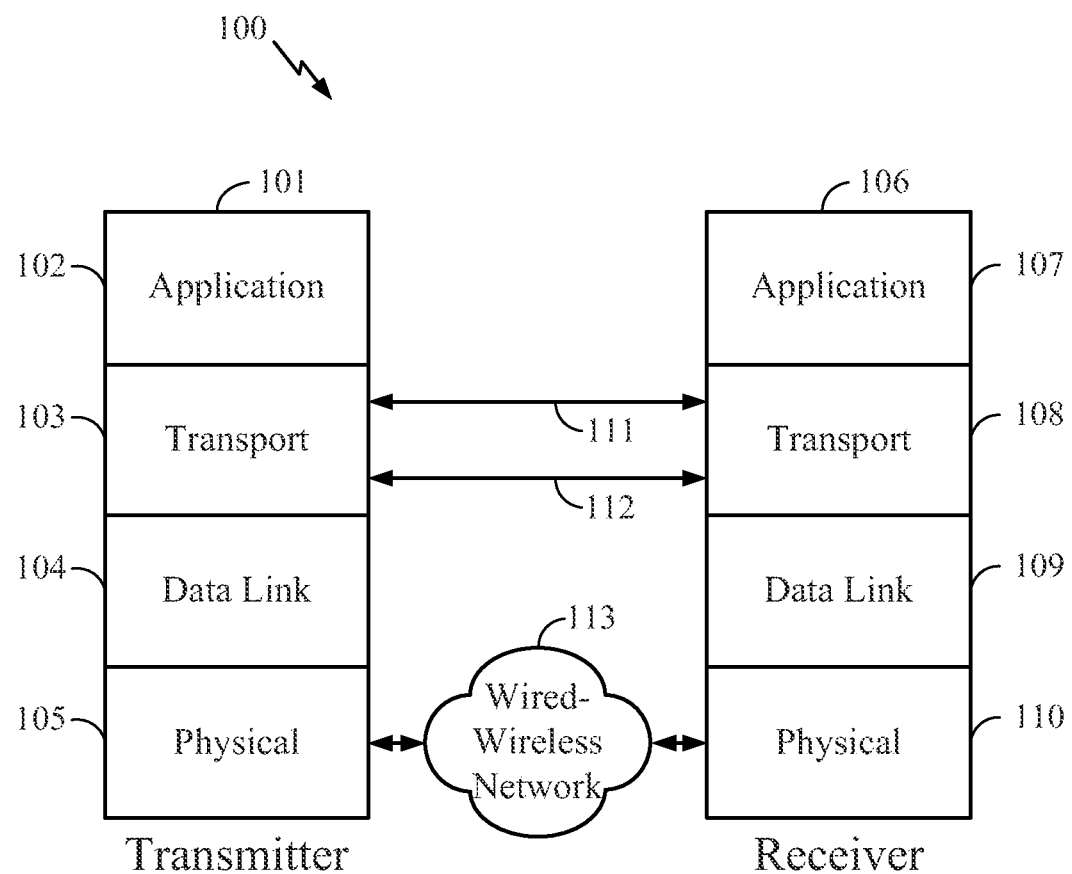
FIG. 1 is a simplified prior art system showing protocol stacks for a transmitter and a receiver.
Figure 2:
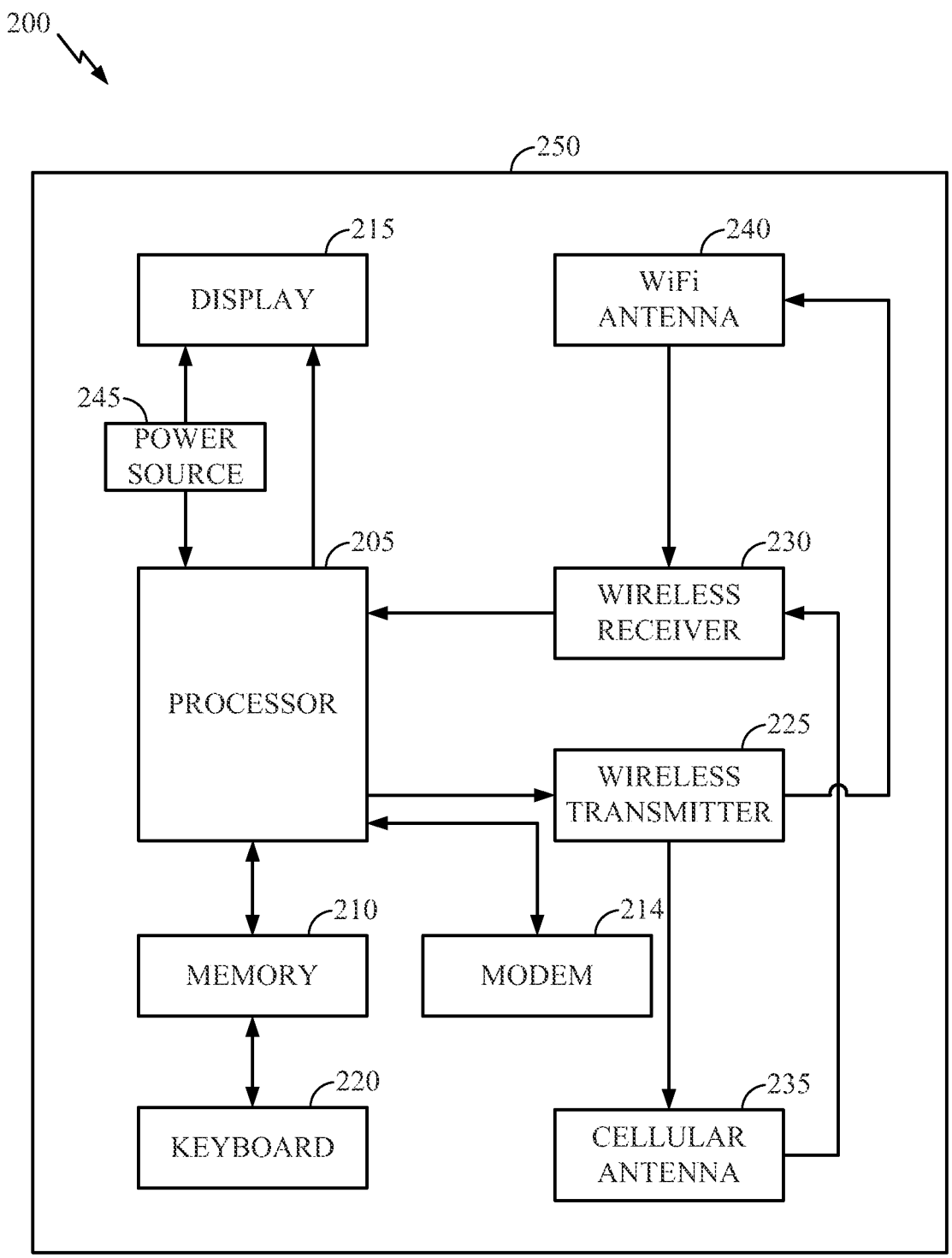
FIG. 2 is a block diagram of an exemplary node in accordance with various embodiments.

FIG. 2 is a block diagram of an exemplary node 200 (e.g., a wireless device) in accordance with various embodiments. The wireless device 200 is configured to receive and transmit signals and data in or using the licensed spectrum and/or the unlicensed spectrum. The data may be control data, multimedia data, voice data, video data, picture data, streaming or still video data, web page data, and other types of data. The wireless device 200 may include a processor 205, a memory 210, a modem 214, a display or a touch screen 215, a keyboard 220, a wireless transmitter 225, a wireless receiver 230, a first antenna 235, a second antenna 240, and a power source 245 (e.g., a battery). The wireless transmitter 225 and/or the wireless receiver 230 may be used to generate the RTCP feedback. The chips, components or modules may be attached or formed on a printed circuit board 250. The printed circuit board 250 can refer to any dielectric substrate, ceramic substrate, or other circuit carrying structure for carrying signal circuits and electronic components within the wireless device 200.

The processor 205 may be implemented using hardware, software, firmware, middleware, microcode, or any combination thereof. The processor 205 may be an Advanced RISC Machine (ARM), a controller, a digital signal processor (DSP), a microprocessor, an encoder, a decoder, circuitry, a processor chip, or any other device capable of generating and processing data, and combinations thereof. The processor 205 may be used to generate the RTCP feedback. The term "circuitry" may include processor circuitry, memory circuitry, RF transceiver circuitry, power circuitry, video circuitry, audio circuitry, keyboard circuitry, and display circuitry.

The memory 210 may include or store various routines and data. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The machine readable instructions may be stored in the memory 210 and may be executed by the processor 205 to cause the processor 205 to perform various functions as described in this disclosure.

The modem 214 may be implemented using software, hardware, circuitry, and combinations thereof. The modem 214 may be a wireless modem with RTCP proxy and may be used to generate the proxied RTCP feedback. The display 215 may be a LCD, LED, plasma display screen or a touch screen and the keyboard 220 may be a standard keyboard (e.g., a QWERTY layout) having letters and numbers. The keyboard 220 may be implemented on or using the touch screen.

The wireless transmitter 225 is coupled to the processor 205 and is used to encode and format the data for transmission via the first antenna 235 and/or the second antenna 240. The wireless transmitter 225 includes chips, circuitry and/or software that are used to transmit the data and/or signals that are received from the processor 205 to the first antenna 235 and/or the second antenna 240 for transmission over one or more channels.

The wireless receiver 230 is coupled to the processor 205 and is used to decode and parse the data after being received from the first antenna 235 and/or the second antenna 240. The wireless receiver 230 includes chips, circuitry and/or software that are used to receive the data and/or signals from the first antenna 235 and/or the second antenna 240. The data and/or signals are sent to the processor 205 for calculation and/or use by the processor 205.

The first antenna 235 may be positioned at a lower right portion of the wireless device 200 and the second antenna 240 may be positioned at an upper right portion of the wireless device 200. The first antenna 235 may be a cellular antenna, a GSM antenna, a CDMA antenna, a WCDMA antenna, or any other antenna capable of operating using the licensed spectrum. The second antenna 240 may be a WiFi antenna, a GPS antenna, or any other antenna capable of operating using the unlicensed spectrum. The power source 245 (e.g., a battery) supplies power to the components or modules shown in FIG. 2.

Figure 3:
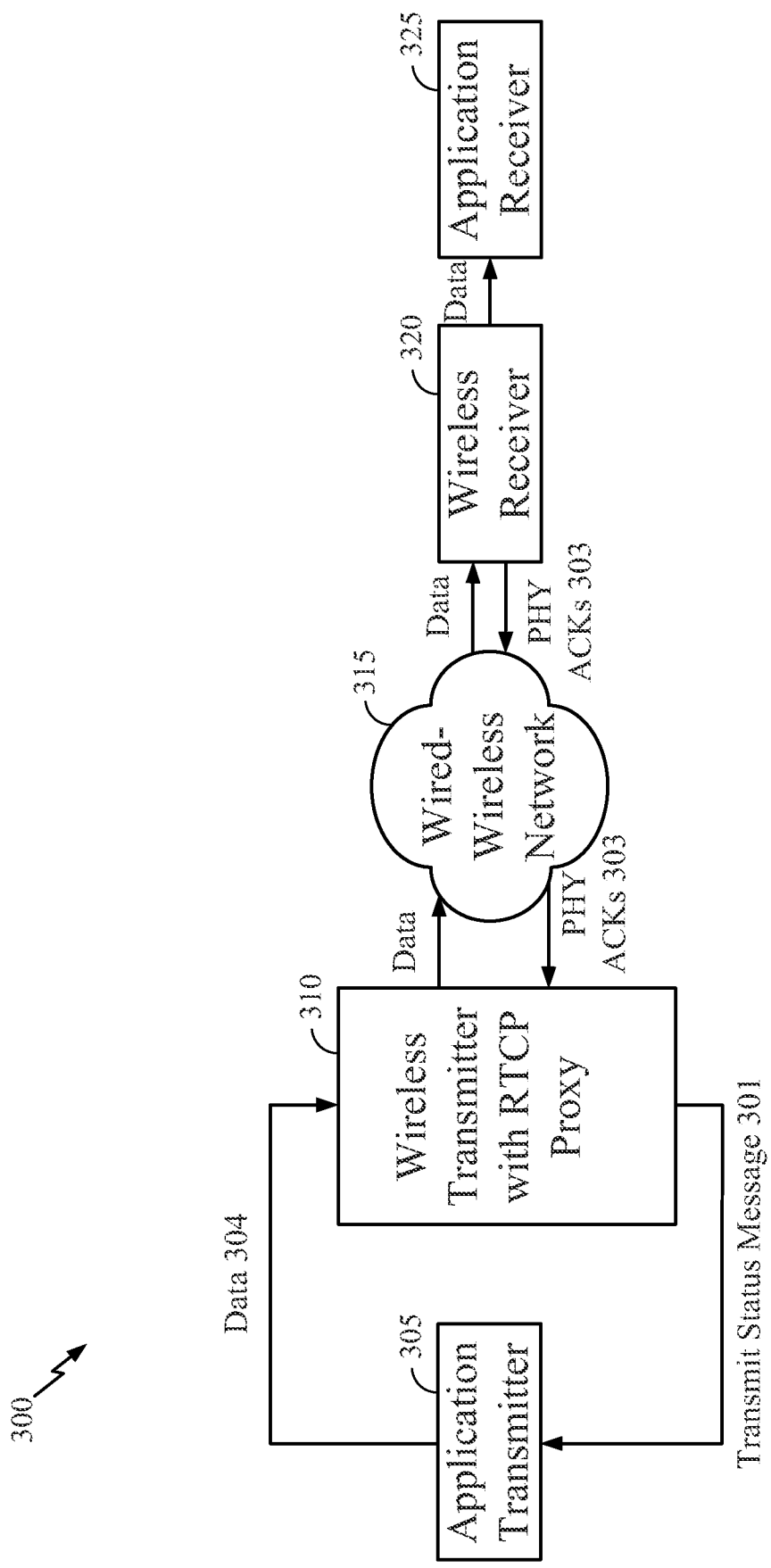
FIG. 3 is a simplified block diagram of a system having an application transmitter, a wireless transmitter, a wired and/or wireless network, a wireless receiver, and an application receiver in accordance with various embodiments.

FIG. 3 is a simplified block diagram of a system 300 having an application transmitter 305, a wireless transmitter 310, a wired and/or wireless network 315, a wireless receiver 320, and an application receiver 325 in accordance with various embodiments. The wireless transmitter 310 may be a wireless modem with RTCP proxy.

The application transmitter 305 may be used to transmit a plurality of applications and the information on each of the plurality of applications to the application receiver 325. The application transmitter 305 may generate a transmission stream for transmitting the plurality of applications and the information on each of the plurality of applications to the application receiver 325. For example, the application transmitter 305 may generate the plurality of applications and the information on each of the plurality of applications in the form of an MPEG-2 transmission stream, sequentially converts the MPEG-2 transmission stream into an object carousel, a data carousel, and a MPEG-2 digital storage media command and control (DSM-CC) message, and broadcasts the DSM-CC message.

The wireless transmitter 310 and/or the wireless receiver 320 can be implemented in a similar manner to the wireless device 200 shown in FIG. 2 or can be implemented using one or more of the components or devices of the wireless device 200 shown in FIG. 2. Other configurations can also be used to implement the wireless transmitter 310 and/or the wireless receiver 320. The wireless transmitter 310 and/or the wireless receiver 320 may each be a transceiver capable of transmitting and receiving data and/or signals. The application transmitter 305, the wireless transmitter 310, the wired and/or wireless network 315, the wireless receiver 320, and/or the application receiver 325 are configured to execute the algorithms, computations, and methods described herein. The algorithms, computations, and methods described herein can be implemented using hardware, software, and combinations thereof.

The application transmitter 305 and the wireless transmitter 310 may be co-located or located in different areas (i.e., non-co-located). Similarly, the application receiver 325 and the wireless receiver 320 may be co-located or located in different areas (i.e., non-co-located).

In various embodiments, the wired-wireless network 315 can include one or more networks such as a local area network (LAN), a wireless local area network (WLAN), a wireless fidelity (WiFi) network, an unlicensed network (i.e., a network operating in the unlicensed spectrum), a licensed network (i.e., a network operating in the licensed spectrum) and/or a carrier sense multiple access with collision avoidance (CSMA/CA) network.

Figure 4:
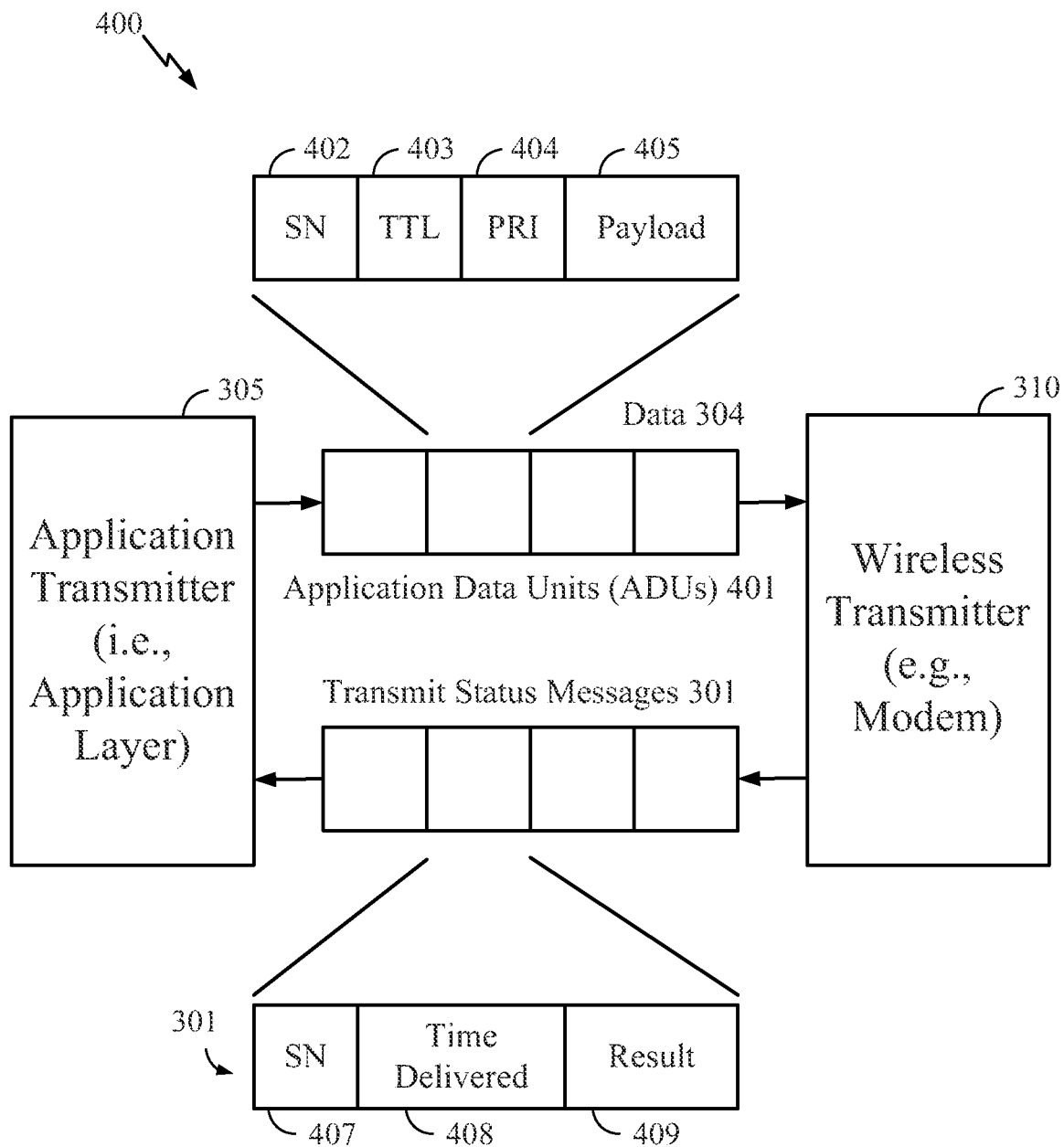
FIG. 4 is a simplified block diagram of a generic real-time interface between the application transmitter and the wireless transmitter using an application-layer framing concept of network protocols in accordance with various embodiments.

FIG. 4 is a simplified block diagram of a generic real-time interface between the application transmitter 305 and the wireless transmitter 310 using an application-layer framing concept of network protocols in accordance with various embodiments. The generic real-time application layer interface can be implemented within the wireless transmitter 310 for most radio access technologies. Following the application-layer framing concept of network protocols, the data 304 is transmitted from the application transmitter 305 to the wireless transmitter 310 in application data units (ADUs) 401 (block 705, FIG. 7). Each ADU 401 may include four fields such as a sequence number (SN) field 402, a time-to-live (TTL) field 403, a priority (PRI) field 404, and a payload field 405. The SN field 402 includes a sequence number that is used to identify return physical layer acknowledgments (i.e., PHY ACKs 303) indicating that the data 304 have been received correctly by the wireless receiver 320. The TTL field 403 includes a TTL time period or value indicating a maximum time period in which the wireless transmitter 310 should attempt to transmit the ADU 401. The PRI field 404 includes a priority value for the ADU 401 indicating the order or priority in which to transmit the ADU 401. The ADU header may include the SN field 402, the TTL field 403, and the PRI field 404. The application transmitter 305 populates the four fields with data or information using the particular application.

The payload field 405 includes data or information related to the application and is typically set to a meaningful unit of the application. The data may be control data, multimedia data, voice data, video data, picture data, streaming or still video data, web page data, and other types of data. For video data, for example, the payload data may be set to a meaningful unit of one video slice or one video frame or sequence of frames. In one embodiment, the size of the payload data is not related to or is not the same as the wireless link-layer media access control (MAC) packet size.

Figure 7:
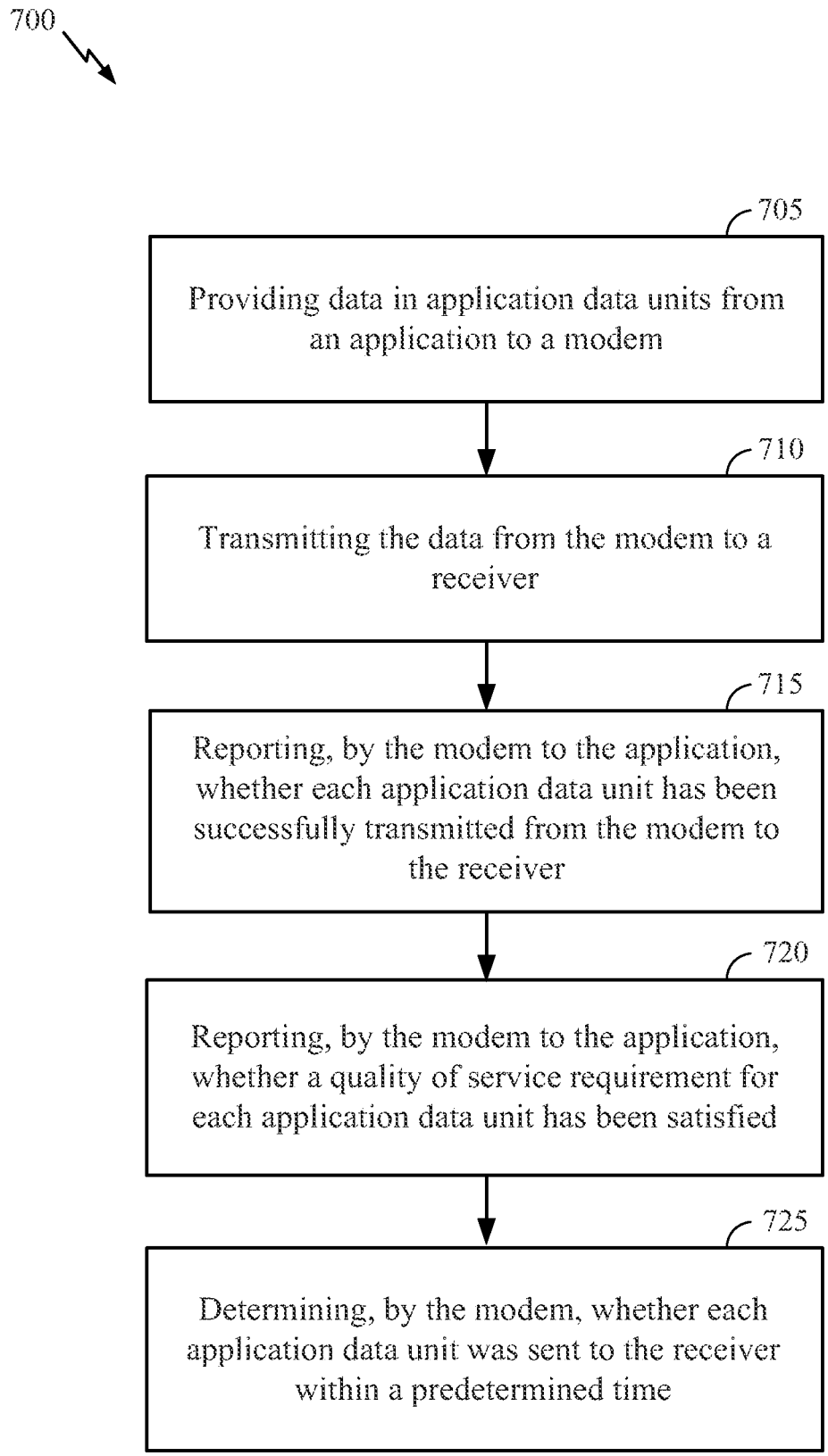
FIG. 7 is a flow chart illustrating a method of providing data between an application and a modem in accordance with various embodiments.

The wireless transmitter 310 attempts to transmit the data 304 in ADUs 401 to the wireless receiver 320 within the TTL time period specified in the TTL field 403 (block 710, FIG. 7). The wireless receiver 320 may transmit a plurality of physical layer acknowledgments (i.e., PHY ACKs 303) to the wireless transmitter 310 indicating that the data 304 have been received correctly at the wireless receiver 320. In one embodiment, the wireless modem 310 determines whether the data 304 has been successfully transmitted from the wireless modem 310 to the wireless receiver 320 by combining a plurality of air-link acknowledgements 303 corresponding to the ADU 401 from the wireless receiver 320. The wireless transmitter 310 reports to the application transmitter 305 whether each ADU 401 has been successfully transmitted from the wireless transmitter 320 to the wireless receiver 320 (block 715, FIG. 7). In one embodiment, the plurality of physical layer acknowledgments sent from the wireless receiver 320 to the wireless transmitter 310 allow the wireless transmitter 310 to determine or know whether each ADU 401 was successfully transmitted from the wireless transmitter 320 to the wireless receiver 320. The wireless transmitter 310 may also reports to the application transmitter 305 whether a quality of service (QoS) requirement for each ADU 401 has been satisfied (block 720, FIG. 7). The wireless transmitter 310 is also able to determine whether each ADU 401 was sent to the wireless receiver 320 within the TTL time period (block 725, FIG. 7).

After the wireless transmitter 310 has successfully transmitted the ADU 401 or after the TTL time period has expired, the wireless transmitter 310 sends a transmit status message 301 to the application transmitter 305. Each transmit status message 301 may include three fields such as a sequence number (SN) field 407, a time delivered field 408, and a result field 409. The SN field 407 includes the sequence number of the ADU 401 that the status is for. The time delivered field 408 includes a time at which either the wireless transmitter 310 was able to deliver or transmit the ADU 401 or a time at which the wireless transmitter 310 gave up the transmission attempt. The result field 409 includes an indicator indicating whether the ADU 401 was successfully transmitted or whether the time expired before successful transmission.

Several advantages exist for utilizing the generic real-time interface between the application transmitter 305 and the wireless transmitter 310 using the application-layer framing concept of network protocols. First, the generic real-time interface allows for scalability with any radio access technology and does not have any radio access technology specific components. For example, the payload field 405 can be set to a meaningful unit of the application and does not need to be formatted for the wireless link. The wireless transmitter 310 is able to determine how to transmit the plurality of ADUs 401. Second, the generic real-time interface provides precise feedback (i.e., transmit status message 301) at the resolution of the ADU 401. Third, the interface functions in real-time in that the wireless transmitter 310 can notify the application immediately on whether the ADU 401 was successfully transmitted or not, so that the application transmitter 305 can adjust quickly.

Figure 5:
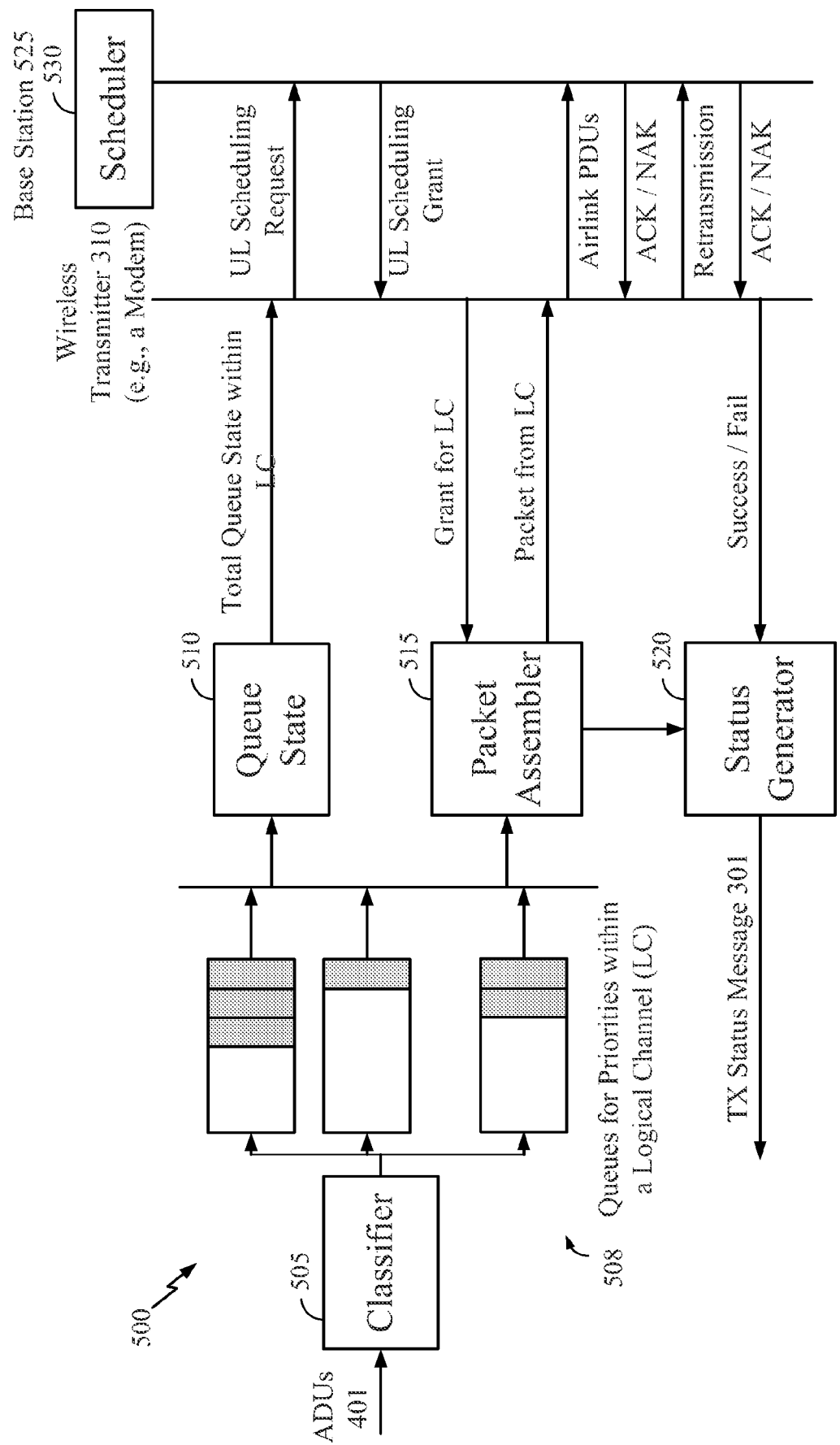
FIG. 5 is a flow diagram showing a priority queue implementation of the generic real-time application layer framing interface for an exemplary 3rd Generation Partnership Project Long Term Evolution (3 GPP LTE) air interface in accordance with various embodiments.

FIG. 5 is a flow diagram showing a priority queue implementation of the generic real-time application layer framing interface for an exemplary 3rd Generation Partnership Project Long Term Evolution (3 GPP LTE) air interface in accordance with various embodiments. The implementation shows uplink (UL) transmissions of application data 304 from the wireless transmitter 310 to a base station 525. Similar structures and functions as described herein can be used to implement other radio access technologies.

For LTE applications, the data 304 is divided or parsed into one or more logical channels (LCs) where each LC has a quality of service (QoS). In FIG. 5, only one LC is used for the ADUs 401 of the applications. This single LC may be referred to as an application LC; however, other embodiments and implementations may include several other LCs from the same wireless transmitter 310. The input for the other LCs may or may not provide the application-layer framing concept or interface. Each ADU 401 has a QoS requirement and the wireless transmitter 310 (e.g., modem) reports to the application whether the QoS requirement has been satisfied. In one embodiment, the QoS requirement is a time to live that represents a maximum time the wireless transmitter 310 has to transmit a set of ADUs 401 and the wireless transmitter 310 indicates whether each ADU 401 within the set of ADUs was sent within the maximum time.

The ADUs 401 received from the application transmitter 305 are processed by the wireless transmitter 310. In one embodiment, the wireless transmitter 310 includes a classifier 505 that reads the priority value of each ADU 401 and places the ADUs 401 into a buffer or a queue 508 based on the priority value contained in the PRI field 404. The wireless transmitter 310 may include a queue state module 510 that reports the total buffer levels (e.g., total number of ADUs) in all of the queues 508. In one embodiment, the queue state module 510 may report a total queue state within each LC. The wireless transmitter 310 or the queue state module 510 creates an UL scheduling request based on the total buffer levels in the application LC and well as any other LCs.

The base station 525 may include a base station scheduler 530 that creates a UL scheduling grant based on the load of the LC, the channel conditions, and the relative priority of the UL scheduling request with other transmitters or users in the cell. The UL scheduling grant may be shared amongst several other LCs within the wireless transmitter 310. The wireless transmitter 310 determines the total number of bytes that can be transmitted corresponding to the particular UL scheduling grant and allocates or grants at least a fraction of a transport block to the application LC (also known as "Grant for LC").

The transport block is processed by a packet assembler 515, which selects the data to be transmitted from the queue 508. The wireless transmitter 310 can implement various scheduling policies to transmit the data from the queue 508. The scheduling policies are generally configured by the application and may include strict priority or weighted utility. Once the data is scheduled using a scheduling policy, the data is transmitted back to the wireless transmitter 310 as a packet from LC. Since the grant size may have no relation to the ADU payload size, the packet from LC may be a multiple or fraction of the ADUs payloads.

The wireless transmitter 310 assembles the packet from LC with data from other LCs and forms an airlink protocol data unit (PDU). The wireless transmitter 310 attempts to transmit the airlink PDU to the base station 525 and receives an ACK or NAK from the base station 525 depending on whether the transmission was successful. If the transmission was unsuccessful, the wireless transmitter 310 attempts to retransmit at the physical layer or the RLC layer depending on the scheduling attributes of the LC. The retransmission policy is completely transparent to the application.

Regardless of the retransmission policy, the ADUs 401 are successfully transmitted within the TTL time period or not successfully transmitted within the TTL time period. Depending on the success of the transmission, a status generator 520 generates a transmission status message 301 and transmits the transmission status message 301 to the application transmitter 305.

Figure 6:
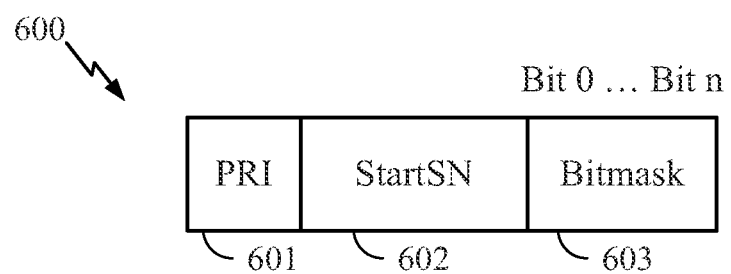
FIG. 6 is a structure of a message for preempting transmission of delivered ADUs in accordance with various embodiments.

FIG. 6 is a structure of a message 600 for preempting transmission of delivered ADUs 401 in accordance with various embodiments. Each message 600 may include three fields such as a priority (PRI) field 601, a start sequence number (StartSN) field 602, and a bitmask field 603. The PRI field 601 includes a priority value that was used when the ADU 401 was delivered to the wireless transmitter 310. The StartSN field 602 includes the sequence number of the ADU 401 that corresponds to the first most-significant bit in the bitmask. The bitmask field 603 includes a (n+1)-bit bitmask that denotes the action to be taken for the ADUs in the range [StartSN, StartSN+n] with 1 at bit m denoting that the ADU 401 with SN equal to (SrartSN+m) be dropped.

An example of where the message 600 can be used is as follows. An application may determine that it is beneficial not to transmit ADUs that have been delivered to the wireless transmitter 310. For example, the application may involve the transmission of a scalable video stream. Suppose the wireless transmitter 310 has been experiencing channel conditions that allow for the transmission of a base layer along with an enhancement layer and accordingly, the application has been delivering ADUs for both the layers to the wireless transmitter 310. Now, suppose the channel conditions change suddenly so that the wireless transmitter 310 can support the transmission of only the base layer. If the enhancement layer ADUs are queued up at the wireless transmitter 310 with TTL time periods smaller than those of some of the base layer ADUs, then the wireless transmitter 310 may try to transmit the enhancement layer ADUs before the base layer ADUs. However, this might result in some base layer ADUs being delayed or dropped. The application might avoid too many base layer ADUs being delayed or dropped if the application instructs the wireless transmitter 310 to ignore the enhancement layer ADUs it had previously delivered to the wireless transmitter 310. To enable this operation, the message 600 to the interface can be used to provide the wireless transmitter 310 with the tags (e.g., SN/PRI) of the buffered ADUs that the wireless transmitter 310 should drop without attempting to transmit.

Figure 8:
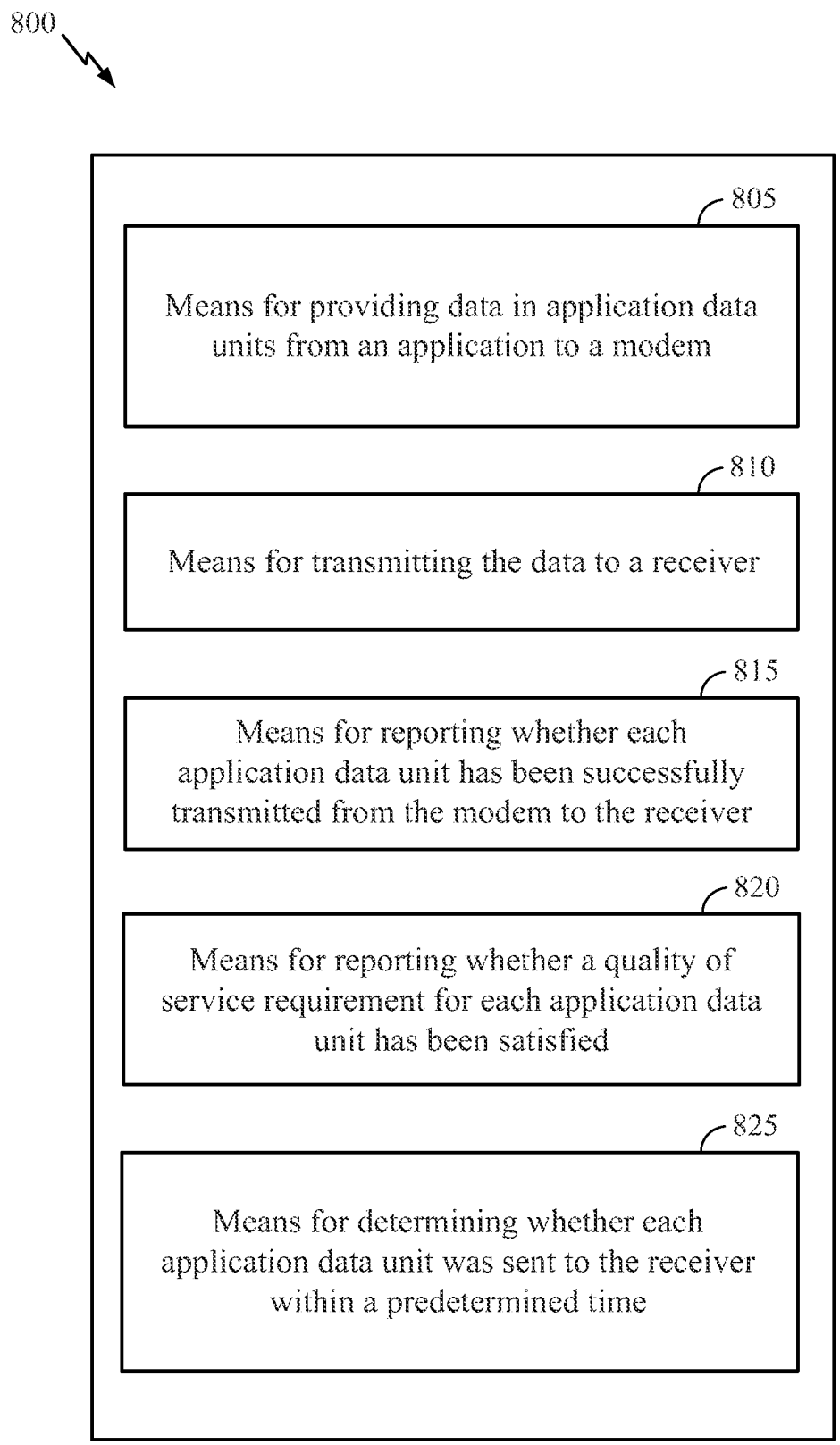
FIG. 8 is a block diagram illustrating exemplary components for the apparatus and the means for providing data between an application and a modem in accordance with various embodiments.

FIG. 8 is a block diagram illustrating exemplary components for the apparatus 800 and the means for apparatus 800 for providing data between an application 305 and a modem 310 in accordance with various embodiments. The apparatus 800 may include a module 805 for providing data 304 in ADUs 401 from the application 305 to the modem 310. The apparatus may also include a module 810 for transmitting the data 304 to a wireless receiver 320, a module 815 for reporting whether each ADU 401 has been successfully transmitted from the modem 310 to the wireless receiver 320, a module 820 for reporting whether a quality of service requirement for each ADU 401 has been satisfied, and a module 825 for determining whether each ADU 401 was sent to the wireless receiver 320 within a predetermined time period.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of providing data between an application and a modem, the method comprising:
providing data in application data units from the application to the modem;
preempting transmission of one or more application data units;
transmitting one or more application data units that have not been preempted, from the modem to a receiver; and
reporting by the modem to the application, whether each application data unit has been successfully transmitted from the modem to the receiver.

2. The method of claim 1 wherein the modem is a wireless modem.

3. The method of claim 2 wherein the wireless modem determines whether the data has been successfully transmitted from the modem to the receiver by combining a plurality of air-link acknowledgements corresponding to the application data unit from the receiver.

4. The method of claim 1 wherein each application data unit has a quality of service requirement and the modem reports to the application whether the quality of service requirement has been satisfied.

5. The method of claim 4 wherein the quality of service requirement is a time to live that represents a maximum time the modem has to transmit a set of application data units and the modem indicates whether each application data unit within the set was sent within the maximum time.

6. An apparatus for providing data, the apparatus comprising:
an application for providing data in application data units and for providing a message to preempt transmission of one or more application data units;
a modem for receiving the data and the message, and for preempting transmission of one or more application data units based on the message and transmitting one or more application data units that have not been preempted, to a receiver, the modem configured to report to the application, whether each application data unit has been successfully transmitted from the modem to the receiver.

7. The apparatus of claim 6 wherein the modem is a wireless modem.

8. The apparatus of claim 7 wherein the wireless modem determines whether the data has been successfully transmitted from the modem to the receiver by combining a plurality of air-link acknowledgements corresponding to the application data unit from the receiver.

9. The apparatus of claim 6 wherein each application data unit has a quality of service requirement and the modem reports to the application whether the quality of service requirement has been satisfied.

10. The apparatus of claim 9 wherein the quality of service requirement is a time to live that represents a maximum time the modem has to transmit a set of application data units and the modem indicates whether each application data unit within the set was sent within the maximum time.

11. An apparatus for providing data, the apparatus comprising:
   means for providing data in application data units and for providing a message to preempt transmission of one or more application data units; and
   means for receiving the data and the message, and for preempting transmission of one or more application data units based on the message and for transmitting one or more application data units that have not been preempted, to a receiver, the means for receiving, preempting and transmitting configured to report to the means for providing, whether each application data unit has been successfully transmitted to the receiver.

12. The apparatus of claim 11 wherein the means for receiving, preempting and transmitting is a wireless modem.

13. The apparatus of claim 12 wherein the wireless modem determines whether the data has been successfully transmitted from the means for receiving, preempting and transmitting to the receiver by combining a plurality of air-link acknowledgements corresponding to the application data unit from the receiver.

14. The apparatus of claim 11 wherein each application data unit has a quality of service requirement and the means for receiving, preempting and transmitting reports to the application whether the quality of service requirement has been satisfied.

15. The apparatus of claim 14 wherein the quality of service requirement is a time to live that represents a maximum time the means for receiving, preempting and transmitting has to transmit a set of application data units and the means for receiving and transmitting indicates whether each application data unit within the set was sent within the maximum time.

16. A non-transitory machine readable medium embodying machine executable instructions to implement a method of providing data between an application and a modem, the method comprising:
   providing data in application data units from the application to the modem;
   preempting transmission of one or more application data units;
   transmitting one or more application data units that have not been preempted, from the modem to a receiver; and
   reporting by the modem to the application, whether each application data unit has been successfully transmitted from the modem to the receiver.

17. The machine readable medium of claim 16 wherein the modem is a wireless modem.

18. The machine readable medium of claim 17 wherein the wireless modem determines whether the data has been successfully transmitted from the modem to the receiver by combining a plurality of air-link acknowledgements corresponding to the application data unit from the receiver.

19. The machine readable medium of claim 16 wherein each application data unit has a quality of service requirement and the modem reports to the application whether the quality of service requirement has been satisfied.

20. The machine readable medium of claim 19 wherein the quality of service requirement is a time to live that represents a maximum time the modem has to transmit a set of application data units and the modem indicates whether each application data unit within the set was sent within the maximum time.

\* \* \* \* \*